(12) United States Patent
Glass et al.

(10) Patent No.: US 9,280,912 B2
(45) Date of Patent: Mar. 8, 2016

(54) NOSE BLOW TRAINING APPARATUS

(71) Applicants: Michael Glass, Piedmont, CA (US);
Jonathan Thorn, Hayward, CA (US);
Tsin-Cheng Chang, San Ramon, CA
(US)

(72) Inventors: Michael Glass, Piedmont, CA (US);
Jonathan Thorn, Hayward, CA (US);
Tsin-Cheng Chang, San Ramon, CA
(US)

(*) Notice: Subject to any disclaimer, the term of this patent is extended or adjusted under 35 U.S.C. 154(b) by 0 days.

(21) Appl. No.: 14/444,558

(22) Filed: Jul. 28, 2014

(65) Prior Publication Data
US 2015/0147735 A1 May 28, 2015

Related U.S. Application Data

(63) Continuation of application No. 13/609,808, filed on Sep. 11, 2012, now abandoned.

(60) Provisional application No. 61/533,260, filed on Sep. 11, 2011.

(51) Int. Cl.
*G09B 19/00* (2006.01)
(52) U.S. Cl.
CPC .................................. *G09B 19/0076* (2013.01)
(58) Field of Classification Search
CPC .......... G09B 23/00; G09B 9/00; G09B 19/00; A63B 69/00
USPC ............. 434/236, 247, 258, 262; 128/200.24, 128/206.21
See application file for complete search history.

(56) References Cited

U.S. PATENT DOCUMENTS

| 2,749,908 A * | 6/1956 | Lee et al. ....................... 600/529 |
| 3,635,214 A * | 1/1972 | Rand et al. ..................... 600/540 |
| 2013/0065209 A1* | 3/2013 | Glass et al. .................... 434/247 |

OTHER PUBLICATIONS

"Simplicity Nasal Mask," https://web.archive.org/web/20100810134725/http://www.healthcare.philips.com/main/homehealth/sleep/simplicity/default.wpd, Aug. 10, 2010 ("Simplicity").*
"Specifications for equipment used for infant pulmonary function testing," Frey et al., Eur Respir J 2000; 16: p. 733.*

* cited by examiner

*Primary Examiner* — Sam Yao
*Assistant Examiner* — Jennifer Fassett
(74) *Attorney, Agent, or Firm* — Tillman Wright, PLLC; James D. Wright; David R. Higgins

(57) ABSTRACT

A training apparatus for training a child how to blow his or her nose includes a tapered chute having proximal and distal ends. The tapered chute defines an internal passageway connecting the proximal and distal ends. The proximal end includes a proximal opening that is sufficiently wide to fit over a child's nose. The distal end includes a distal opening that is smaller than the proximal opening. The internal passageway includes a narrow portion, adjoining the distal opening, and sized to snugly accommodate a projectile lodged therein. When air is exhaled into the proximal opening, the exhaled air passes through the internal passageway and builds pressure behind the projectile such that the projectile is forcefully ejectable from the distal opening.

8 Claims, 16 Drawing Sheets

NOSE BLOW TRAINING APPARATUS

CROSS REFERENCE TO RELATED APPLICATION

The present application is a U.S. continuation patent application of, and claims priority under 35 U.S.C. §120 to, U.S. nonprovisional patent application Ser. No. 13/609,808, filed Sep. 11, 2012, which nonprovisional patent application published as U.S. patent application publication no. 2013/0065209, which patent application and any patent application publications thereof are incorporated by reference herein, and which '808 application is a U.S. nonprovisional patent application of, and claims priority under 35 U.S.C. §119(e) to, U.S. provisional patent application Ser. No. 61/533,260, filed Sep. 11, 2011 and entitled "NOSE BLOW TRAINER," which is expressly incorporated by reference herein in its entirety.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND

1. Field

The present invention relates generally to a teaching apparatus for young children, and, in particular, to an apparatus for teaching young children how to blow their nose.

2. Background

Nose blowing can come naturally to many children by the time that they reach the age of three. However, for a significant percentage of young children, learning to blow their nose can be a difficult and challenging experience. For the parents of such children, the challenge presented by teaching children how to blow their nose can be altogether exasperating.

Accordingly, a need exists for a training apparatus that can ease the process of teaching young children how to properly blow their nose. This, and other needs, is addressed by one or more aspects of the present invention.

SUMMARY

The present invention comprises a training apparatus for training a child how to blow his or her nose. Broadly defined, the present invention according to one aspect includes a training apparatus, for training a child how to blow his or her nose that includes a tapered chute having proximal and distal ends. The tapered chute defines an internal passageway connecting the proximal and distal ends. The proximal end includes a proximal opening that is sufficiently wide to fit over a child's nose. The distal end includes a distal opening that is smaller than the proximal opening. The internal passageway includes a narrow portion, adjoining the distal opening, and sized to snugly accommodate a projectile lodged therein. When air is exhaled into the proximal opening, the exhaled air passes through the internal passageway and builds pressure behind the projectile such that the projectile is forcefully ejectable from the distal opening.

In features of this aspect, the tapered chute may be made from a silicone material; the tapered chute may be made from a plastic material; the tapered chute may be made using an injecting molding process; and the internal passageway may include a central portion, adjoining the narrow portion, and sized to prevent the projectile from being inhaled.

Broadly defined, the present invention according to another aspect includes a training apparatus for training a child how to blow his or her nose that includes a chute having proximal and distal ends and a whistle component having a whistle opening. The chute defines an internal passageway connecting the proximal and distal ends. The proximal end includes a proximal opening that is sufficiently wide to fit over a child's nose. When air is exhaled into the proximal opening, the exhaled air passes through the internal passageway and at least some of the exhaled air exits via the whistle opening, thereby emitting an audible sound.

In features of this aspect, the chute may be made from a silicone material; the chute may be made from a plastic material; the chute may be made using an injecting molding process; the whistle component may be integral with the chute; the whistle component may be a separate structure adapted to fit into a side of the chute; the whistle component may be adapted to emit a different audible sound when air is inhaled through the whistle opening; and the whistle component may be adapted to be silent when air is inhaled through the whistle opening.

Broadly defined, the present invention according to still another aspect includes a training apparatus for training a child how to blow his or her nose that includes a chute having proximal and distal ends and a force measurement device arranged at the distal end. The chute defines an internal passageway connecting the proximal and distal ends. The force measurement device including a float object positioned therein. The proximal end includes a proximal opening that is sufficiently wide to fit over a child's nose. When air is exhaled into the proximal opening, the exhaled air passes through the internal passageway and builds pressure behind the float object such that the float object is forced upward within the force measurement device.

In features of this aspect, the chute may be made from a silicone material; the chute may be made from a plastic material; the chute may be made using an injecting molding process; the force measurement device may be integral with the chute; the force measurement device may be a separate structure adapted to fit at the distal end of the chute; and the force measurement device may include gradation lines to quantify the amount of force being exerted by the exhaled air.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Further features, embodiments, and advantages of the present invention will become apparent from the following detailed description with reference to the drawings, wherein.

DETAILED DESCRIPTION

Figure 1:
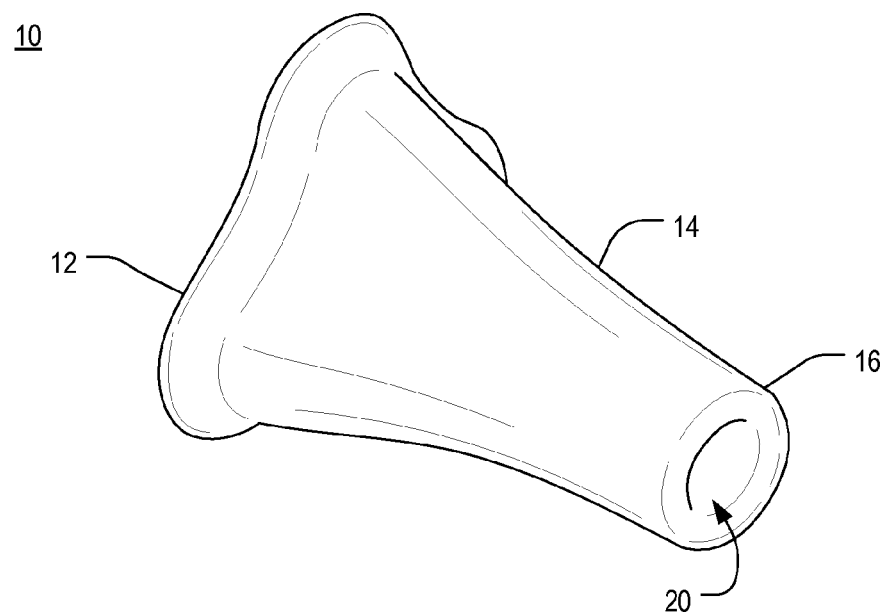
FIGS. 1 and 2 are front perspective views of a training apparatus in accordance with one or more embodiments of the present invention.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers," "a picnic basket having crackers without cheese," and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, in which like numerals represent like components throughout the several views, the preferred embodiments of the present invention are next described. The following description of one or more preferred embodiment(s) is merely exemplary in nature and is in no way intended to limit the invention, its application, or uses.

Figure 2:
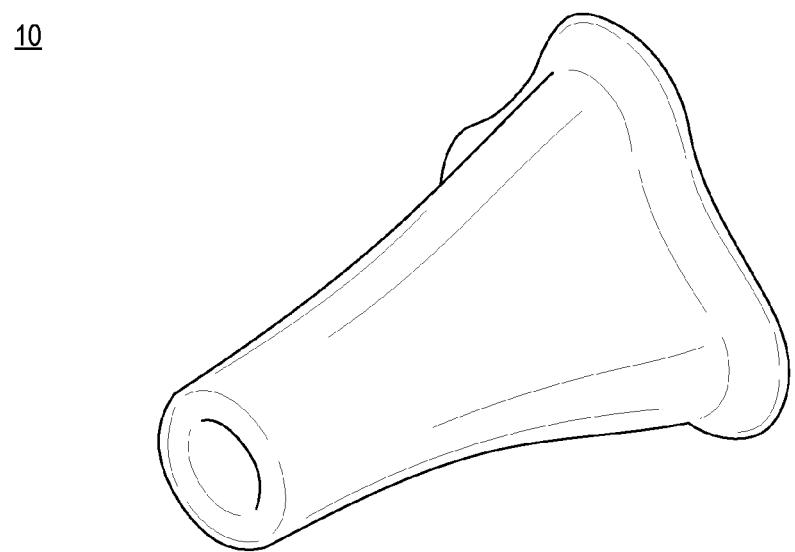
Figure 3:
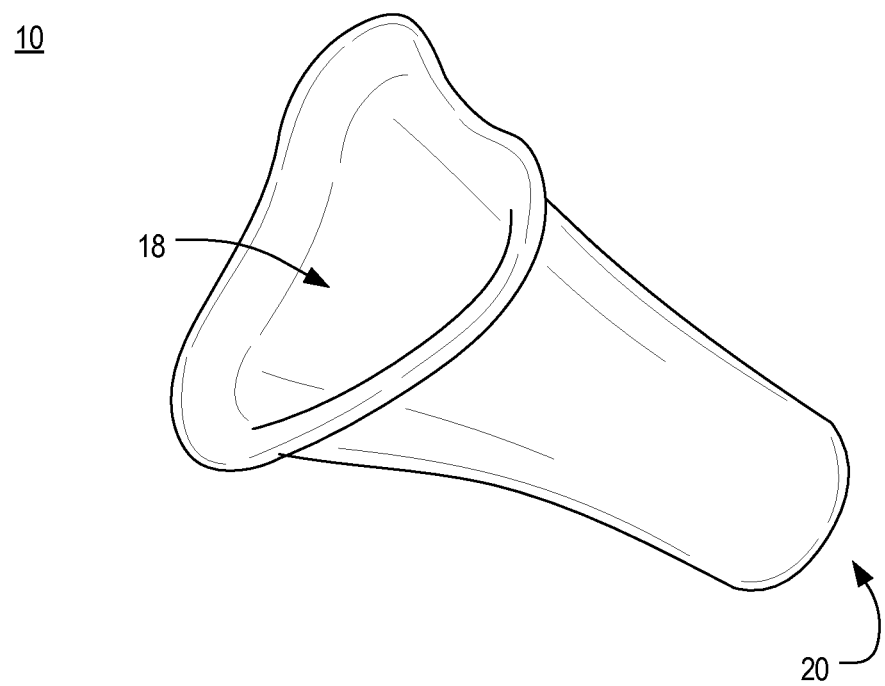
FIG. 3 is a rear perspective view of the training apparatus of FIG. 1.

FIGS. 1 and 2 are front perspective views of a training apparatus 10 in accordance with one or more embodiments of the present invention. FIG. 3 is a rear perspective view of the training apparatus 10 of FIG. 1. The training apparatus 10 of FIGS. 1-3 has a uniform construction and can be made from a molded silicone or plastic material. In this regard, the molded silicone or plastic can impart flexibility and durability to the training apparatus 10.

Figure 4:
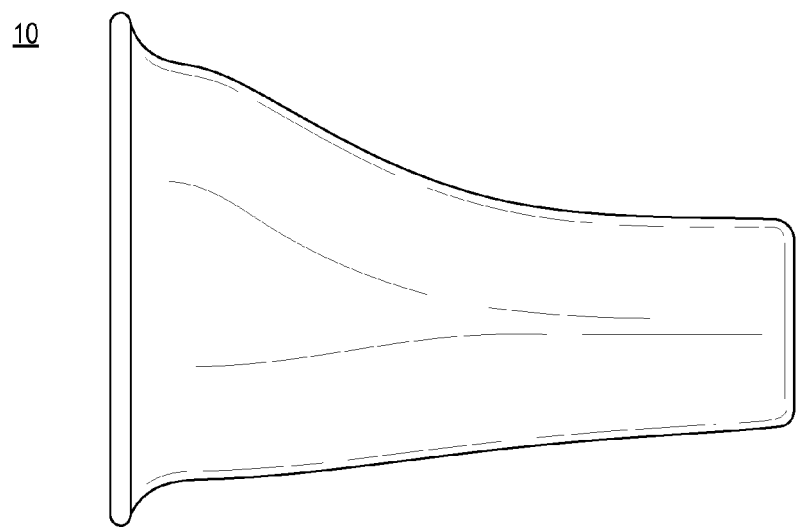
FIG. 4 is a side view of the training apparatus of FIG. 1.
Figure 5:
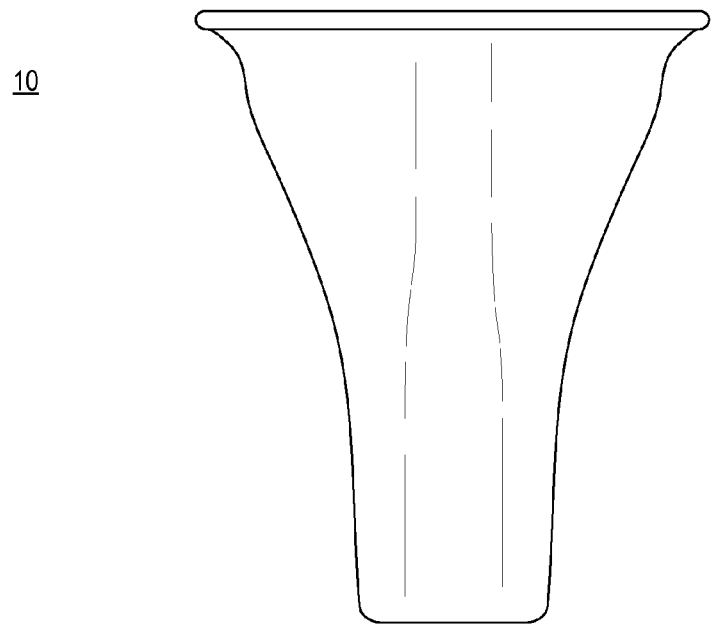
FIG. 5 is a top view of the training apparatus of FIG. 1.
Figure 6:
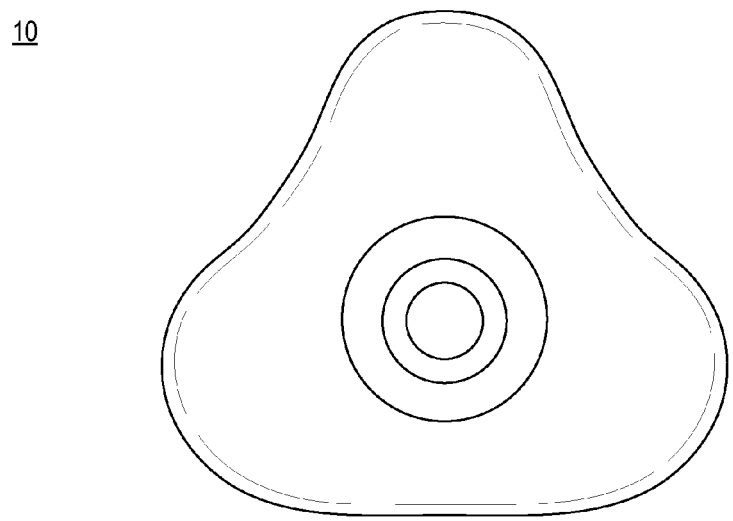
FIG. 6 is a front view of the training apparatus of FIG. 1.
Figure 7:
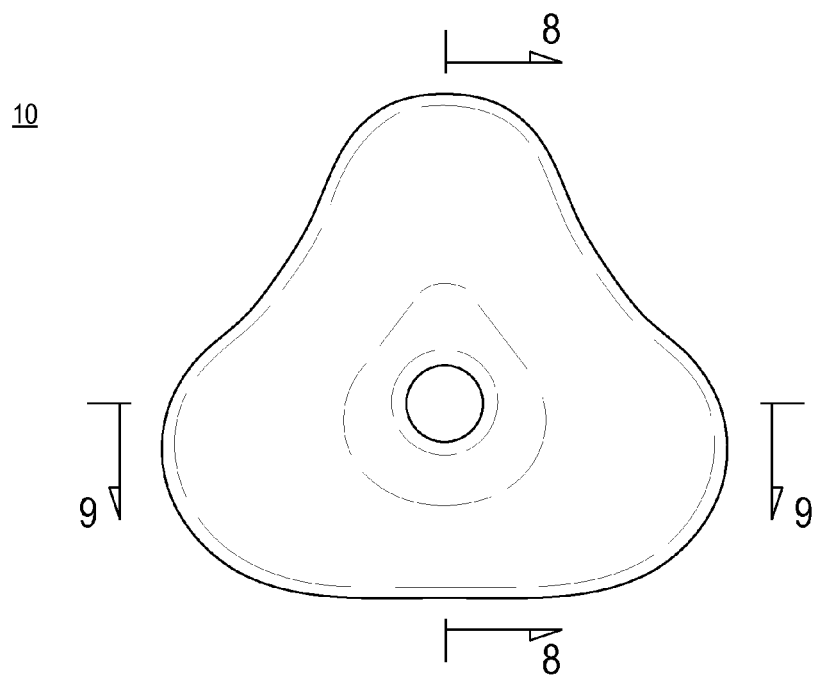
FIG. 7 is a rear view of the training apparatus of FIG. 1.

FIG. 4 is a side view of the training apparatus 10 of FIG. 1, and FIG. 5 is a top view of the training apparatus 10 of FIG. 1. FIG. 6 is a front view of the training apparatus 10 of FIG. 1, and FIG. 7 is a rear view of the training apparatus 10 of FIG. 1. As can be seen in FIGS. 1-7, the training apparatus 10 includes a proximal end 12 and a distal end 16 interconnected with a tapered chute 14. The proximal end 12 includes a proximal opening 18 sized to fit comfortably over the nose of a young child between the approximate ages of two and five. The distal end 16 includes a distal opening 20, which is generally smaller than the proximal opening 18. The tapered chute 14 has a hollow interior such that an internal passageway 28 (perhaps best seen in FIGS. 8 and 9) exists between the proximal opening 18 and the distal opening 20.

Figure 8:
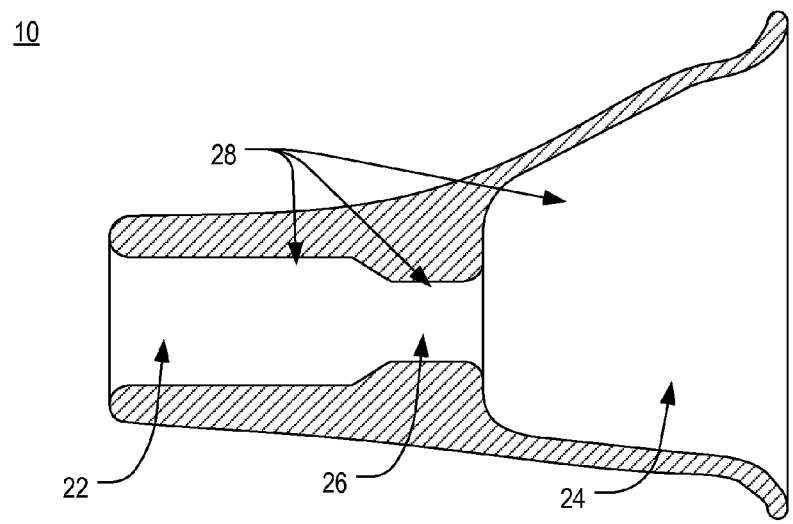
FIG. 8 is a side sectional view of the training apparatus of FIG. 1, taken along line 8-8 of FIG. 7.
Figure 9:
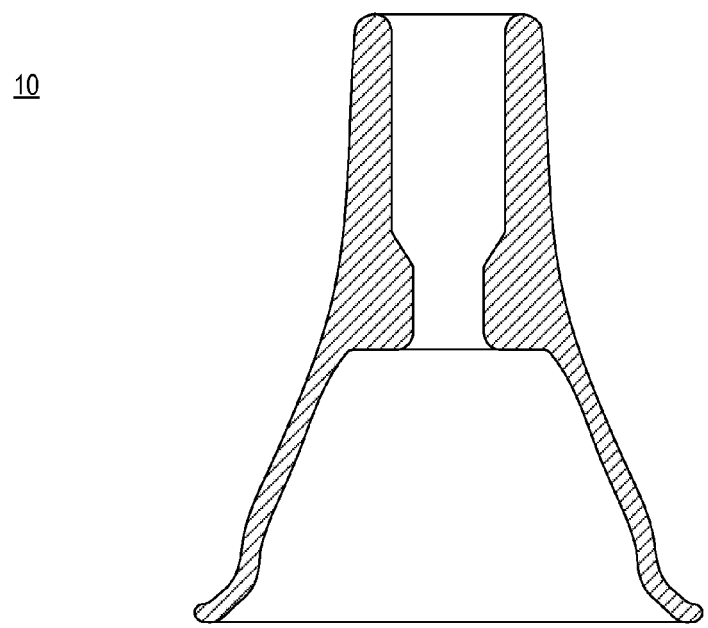
FIG. 9 is a top sectional view of the training apparatus of FIG. 1, taken along line 9-9 of FIG. 7.

FIG. 8 is a side sectional view of the training apparatus 10 of FIG. 1, taken along line 8-8 of FIG. 7, and FIG. 9 is a top sectional view of the training apparatus 10 of FIG. 1, taken along line 9-9 of FIG. 7. As shown in FIGS. 8 and 9, the internal passageway 28 connecting the proximal opening 18 and the distal opening 20 has a width that varies along the length thereof. Toward the proximal opening 18, the internal passageway 28 has a relatively wide portion 24 that is generally bell-shaped, which provides an interior space wide enough to fit comfortably over the nose of a young child. Toward the distal opening 20, the internal passageway 28 has a relatively narrow portion 22 that is generally tube-shaped. Connecting the wide portion 24 with the narrow portion 22 is a central portion 26, which has a width even more narrow than that of the narrow portion 22, advantages of which will be set forth in more detail below.

The internal passageway 28 defines a path by which exhaled air can pass. In particular, air can be exhaled into the wide portion 24 via the proximal opening 18. Exhaled air is then forced into and through the central portion 26 before exiting the training apparatus 10 via the narrow portion 22 of the internal passageway 28 and the distal opening 20.

Figure 10:
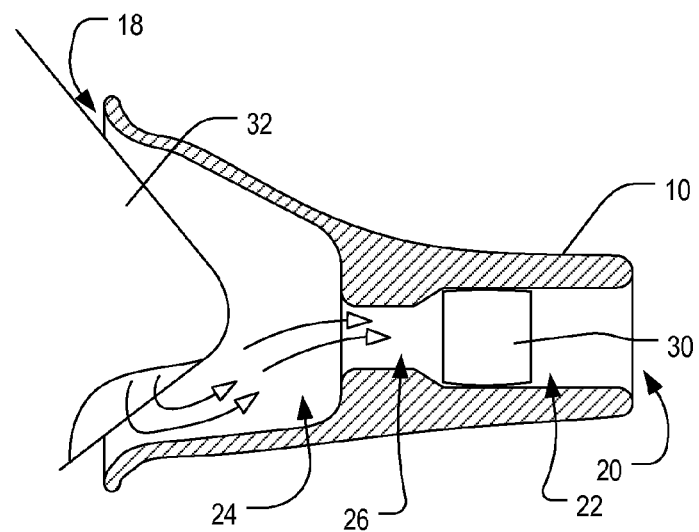
FIG. 10 is a side sectional view of the training apparatus of FIG. 1, taken along line 8-8 of FIG. 7, showing a projectile lodged therein.
Figure 11:
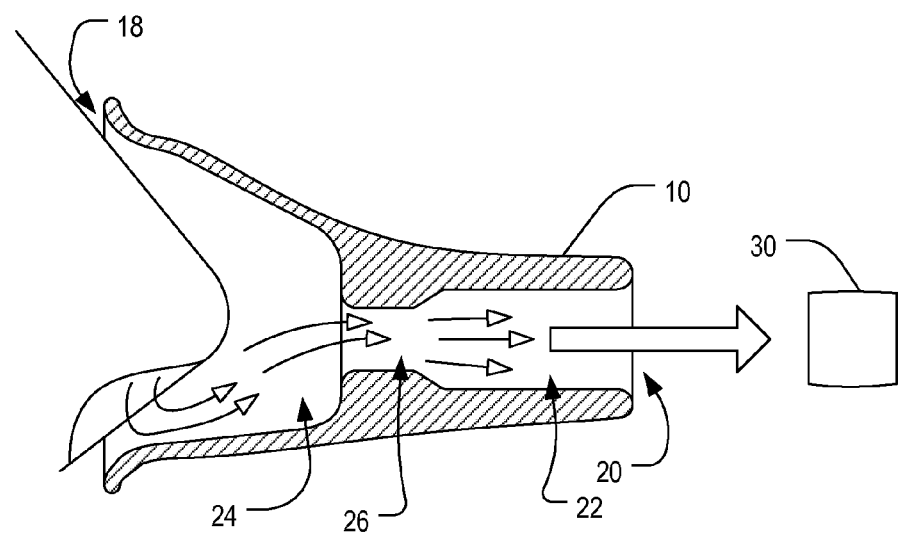
FIG. 11 is a side sectional view of the training apparatus of FIG. 1, taken along line 8-8 of FIG. 7, showing a projectile being ejected therefrom.

FIG. 10 is a side sectional view of the training apparatus 10 of FIG. 1, taken along line 8-8 of FIG. 7, showing a projectile 30 lodged therein, and FIG. 11 is a side sectional view of the training apparatus 10 of FIG. 1, taken along line 8-8 of FIG. 7, showing a projectile 30 being ejected therefrom. In a method of use, the training apparatus 10 is adapted to provide a young child with direct positive feedback as the child learns to exhale through his or her nose. In the contemplated embodiment of FIGS. 1-11, the positive feedback includes enabling the child to forcefully eject a small projectile 30 from the distal end 16 of the training apparatus 10 when the child properly exhales through his or her nose 32. A wide variety of different projectiles can be implemented for use in connection with the training apparatus 10. In one contemplated embodiment, the projectile 30 is a mini-marshmallow, which can be forcefully ejected from the distal end 16 of the training apparatus 10 when the child exhales through his or her nose. An adult can insert projectile 30 into the distal opening 20 of the training apparatus 10, where it may be lodged within the narrow portion 22 of the internal passageway 28. Before or after the projectile 30 is lodged, the adult can place the training apparatus 10 over the child's nose 32. When the child exhales through his or her nose, the exhaled air (represented by arrows in FIGS. 10 and 11) passes through the internal passageway 28 and builds pressure behind the projectile 30. When the pressure is great enough, the projectile 30 is forcefully ejected from the distal opening 20. In this manner, the training apparatus 10 is adapted to help young children learn to blow their nose by increasing proprioception (self awareness) and helping them to learn to purposefully exhale through their nose. The method also provides entertainment for the child, potentially turning a chore or unpleasant experience into a game.

To enhance safety, the training apparatus 10 prevents a young child from inhaling the projectile into his or her nose 32. In particular, a projectile 30 that can be effectively lodged within the narrow portion 22 is too large to pass through the central portion 26 of the internal passageway 28. Thus, when a young child inhales through the training apparatus 10, the projectile 30 is blocked by the central portion 26 from passing into the wide portion 24 of the internal passageway 28. In this manner, the training apparatus 10 prevents a young child from pulling the projectile 30 inward.

According to a contemplated method of manufacturing, the training apparatus 10 can be manufactured using an injection molding process. In particular, a hard exterior mold for the training apparatus 10 can be developed to have a desired shape and size. The silicone or plastic material can be injected into the mold in a liquid form. Once the injected liquid has solidified, the resultant molded component can be removed from the mold.

Figure 12:
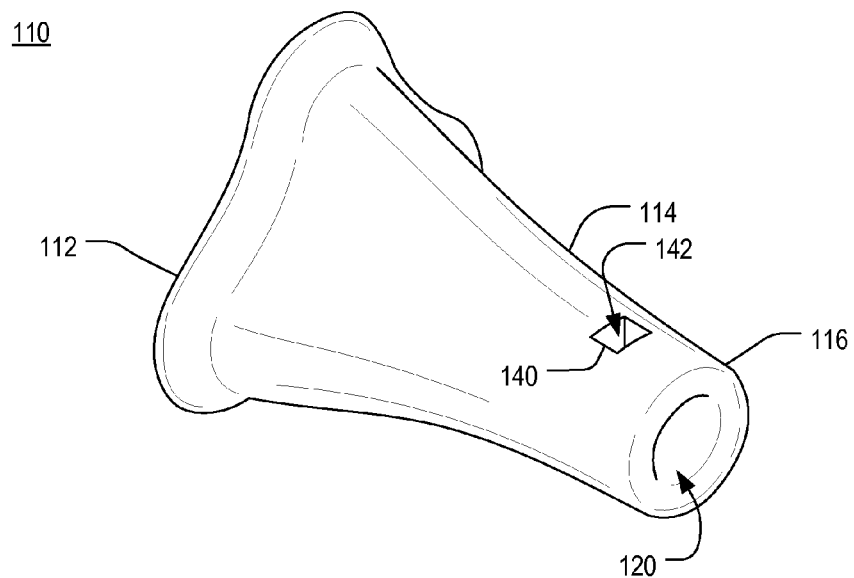
FIGS. 12 and 13 are front perspective views of a training apparatus in accordance with one or more embodiments of the present invention.
Figure 13:
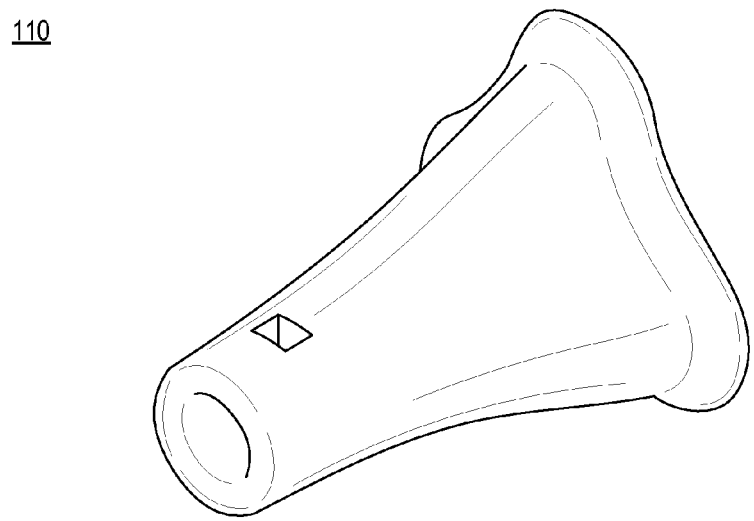
Figure 14:
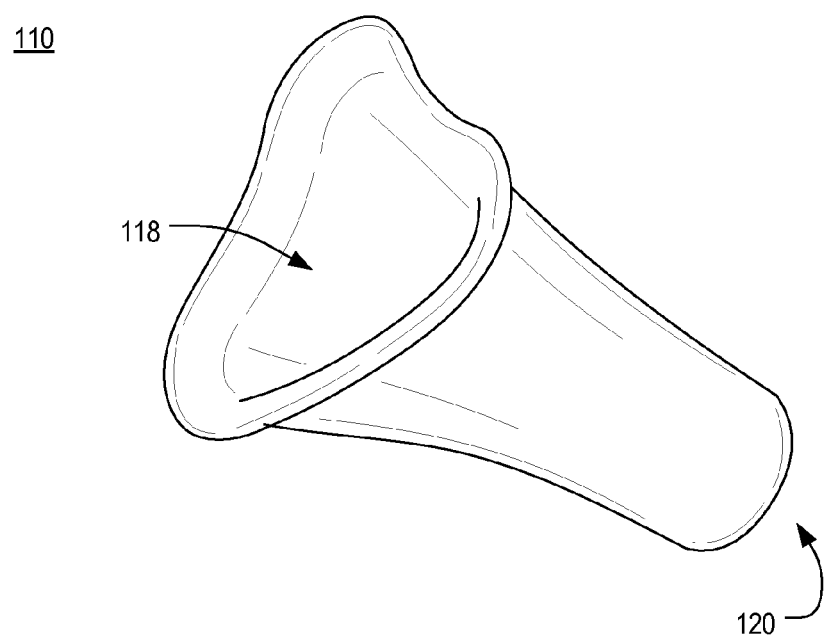
FIG. 14 is a rear perspective view of the training apparatus of FIG. 12.

FIGS. 12 and 13 are front perspective views of a training apparatus 110 in accordance with one or more embodiments of the present invention. FIG. 14 is a rear perspective view of the training apparatus 110 of FIG. 12. The training apparatus 110 of FIGS. 12-14 can have a uniform construction or can be made from a plurality of assembled components. It is contemplated that the training apparatus 110 and components used to assemble the training apparatus 110 can be made from a molded silicone or plastic material. In this regard, the molded silicone or plastic can impart flexibility and durability to the training apparatus 110.

Figure 15:
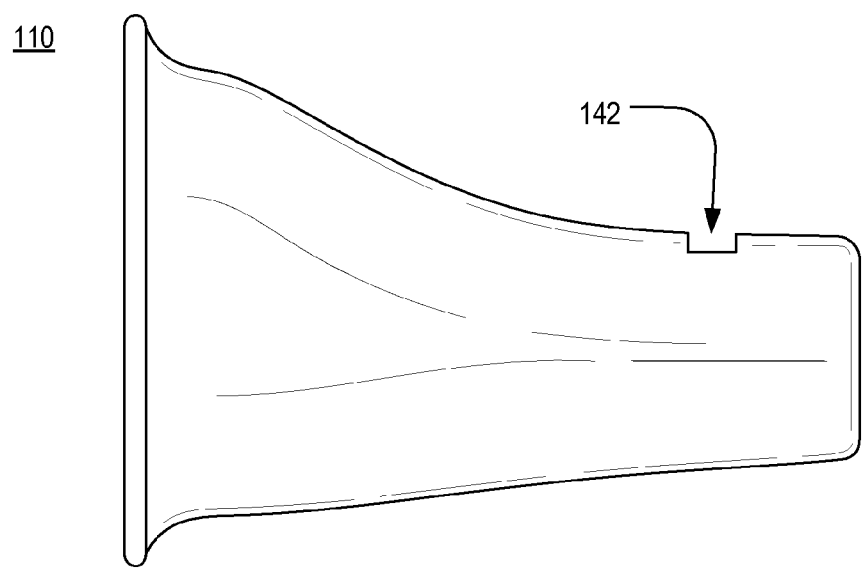
FIG. 15 is a side view of the training apparatus of FIG. 12.
Figure 16:
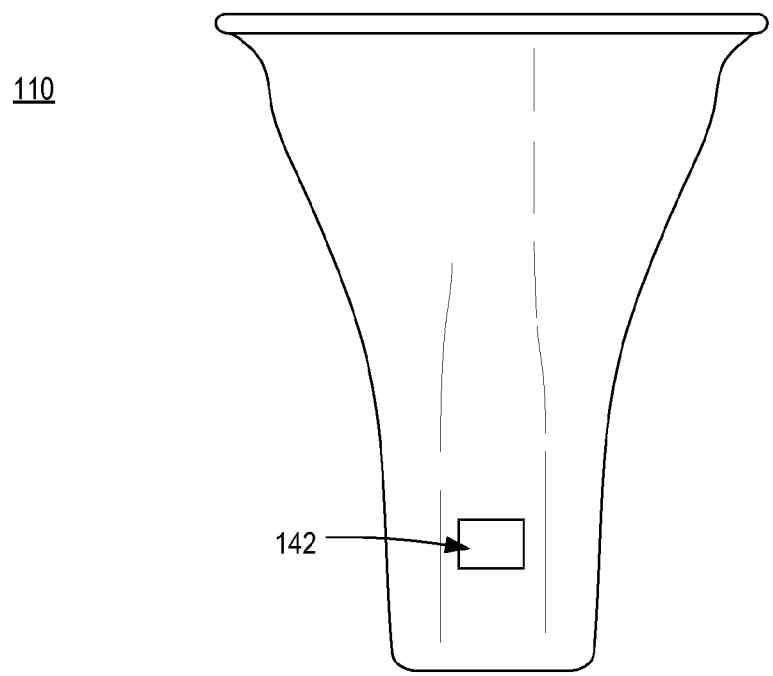
FIG. 16 is a top view of the training apparatus of FIG. 12.
Figure 17:
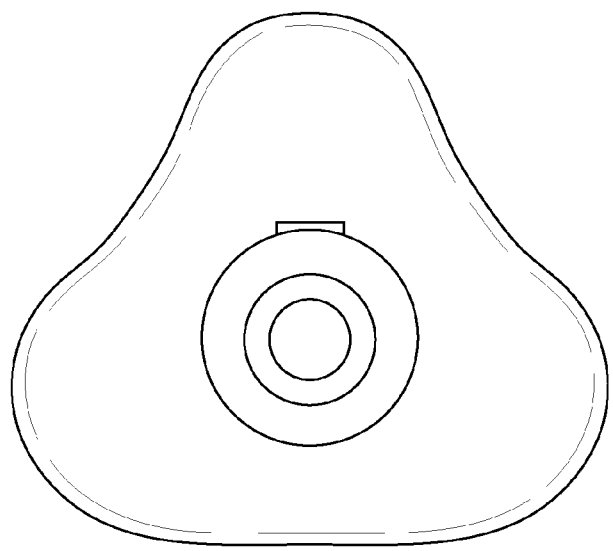
FIG. 17 is a front view of the training apparatus of FIG. 12.
Figure 18:
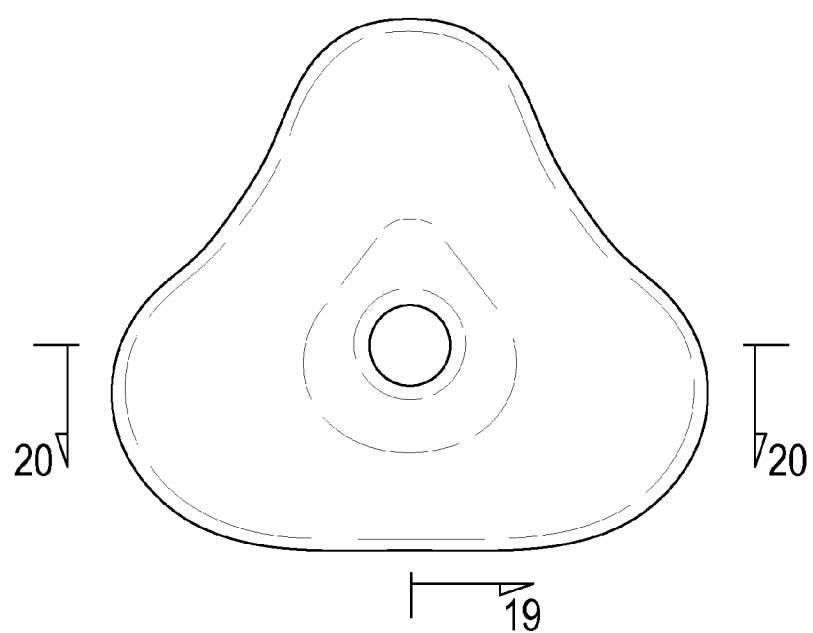
FIG. 18 is a rear view of the training apparatus of FIG. 12.

FIG. 15 is a side view of the training apparatus 110 of FIG. 12, and FIG. 16 is a top view of the training apparatus 110 of FIG. 12. FIG. 17 is a front view of the training apparatus 110 of FIG. 12, and FIG. 18 is a rear view of the training apparatus 110 of FIG. 12. As can be seen in FIGS. 12-18, the training apparatus 110 includes a proximal end 112 and a distal end 116 interconnected with a tapered chute 114. The proximal end 112 includes a proximal opening 118 sized to fit comfortably over the nose of a young child between the approximate ages of two and five. The distal end 116 includes a distal opening 120, which is generally smaller than the proximal opening 118. The tapered chute 114 has a hollow interior such that an internal passageway 128 (perhaps best seen in FIGS. 19 and 20) exists between the proximal opening 118 and the distal opening 120. Additionally, the tapered chute 114 includes a whistle component 140 arranged therein, which includes a whistle opening 142 connecting the internal passageway 128 through the whistle component 140 and out from the training apparatus 110.

Figure 19:
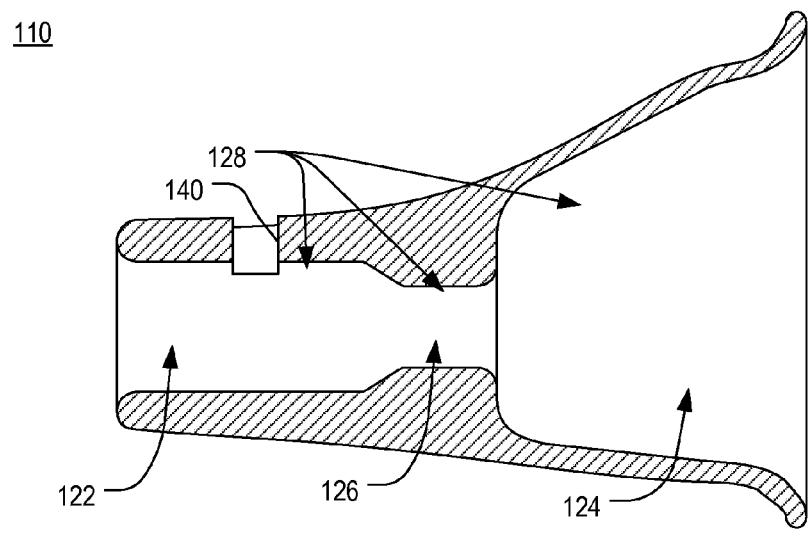
FIG. 19 is a side sectional view of the training apparatus of FIG. 10, taken along line 19-19 of FIG. 18.
Figure 20:
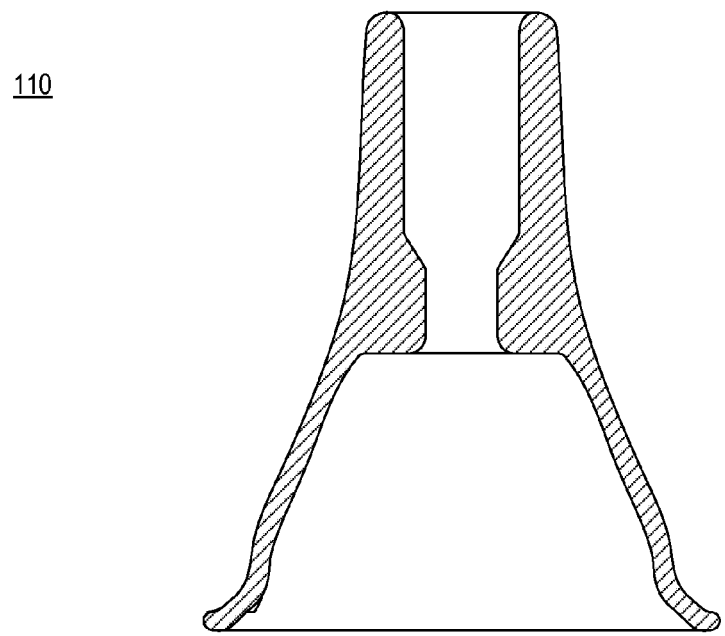
FIG. 20 is a top sectional view of the training apparatus of FIG. 10, taken along line 20-20 of FIG. 18.

FIG. 19 is a side sectional view of the training apparatus 110 of FIG. 10, taken along line 19-19 of FIG. 18, and FIG. 20 is a top sectional view of the training apparatus 110 of FIG. 10, taken along line 20-20 of FIG. 18. As shown in FIGS. 19 and 20, the internal passageway 128 connecting the proximal opening 118 and the distal opening 120 has a width that varies along the length thereof. Toward the proximal opening 118, the internal passageway 128 has a relatively wide portion 124 that is generally bell-shaped, which provides an interior space wide enough to fit comfortably over the nose of a young child. Toward the distal opening 120, the internal passageway 128 has a relatively narrow portion 122 that is generally tube-shaped. Connecting the wide portion 124 with the narrow portion 122 is a central portion 126, which has a width even more narrow than that of the narrow portion 122.

The internal passageway 128 defines a path by which exhaled air can pass. In particular, air can be exhaled into the wide portion 124 via the proximal opening 118. Exhaled air is then forced into and through the central portion 126 before exiting the training apparatus 110 via one of two paths. Some of the exhaled air exits the training apparatus 110 via the narrow portion 122 of the internal passageway 128 and the distal opening 120. Additionally, some of the exhaled air is permitted to exit the training apparatus 110 through the whistle component 140 via the whistle opening 142.

In a method of use, the training apparatus 110 is adapted to provide a young child with direct positive feedback as the child learns to exhale through his or her nose. In the contemplated embodiment of FIGS. 12-20, the positive feedback includes creating an audible sound when the child exhales through his or her nose. While the training apparatus 110 may be configured to emit any of a wide variety of audible sounds, the audible sound emitted in the contemplated embodiment of FIGS. 12-20 is a whistling sound. An adult can place the training apparatus 110 over the child's nose and can encourage the child to exhale air through his or her nose. When air is correctly exhaled, the adult and child can hear the audible sound that is emitted as some of the exhaled air passes through the whistle component 140 and out from the training apparatus 110 via the whistle opening 142. In this manner, the training apparatus 110 is adapted to help young children learn to blow their nose by increasing proprioception (self awareness) and helping them to learn to purposefully exhale through their nose. The method also provides entertainment for the child, potentially turning a chore or unpleasant experience into a game.

Because the internal passageway 128 of the training apparatus 110 remains unobstructed when in use, a young child can inhale air through the training apparatus 110 just as easily as he or she can exhale air through the training apparatus 110. If air is inhaled through the training apparatus 110, at least some of the inhaled air can enter the internal passageway 128 via the whistle opening 142 of the whistle component 140. It is contemplated that the training apparatus 110 can be adapted such that no audible sound is emitted at all when inhaled air passes from outside the training apparatus 110 and into the internal passageway 128 via the whistle opening 142. It is further contemplated that the training apparatus 110 can emit a different audible sound or a different tone when inhaled air passes from outside the training apparatus 110 and into the internal passageway 128 via the whistle opening 142 (as compared with the audible sound or tone that is emitted when exhaled air passes through the internal passageway 128 and out of the training apparatus 110 via the whistle opening 142). In either case, the training apparatus 110 provides the child with audible feedback (or the absence of audible feedback) in order to help them understand the difference between inhaling and exhaling through the nose, and the parent can add positive re-enforcement.

According to a contemplated method of manufacturing, the training apparatus 110 can be manufactured using an injection molding process. In particular, a hard exterior mold for the training apparatus 110 can be developed to have a desired shape and size. The silicone or plastic material can be injected into the mold in a liquid form. Once the injected liquid has solidified, the resultant molded component can be removed from the mold. It is further contemplated that the whistle component 140 can be molded into the training apparatus 110 as part of a unitary construction, or the whistle component 140 can be molded as a separate structure that is then fitted into the training apparatus 110.

Figure 21:
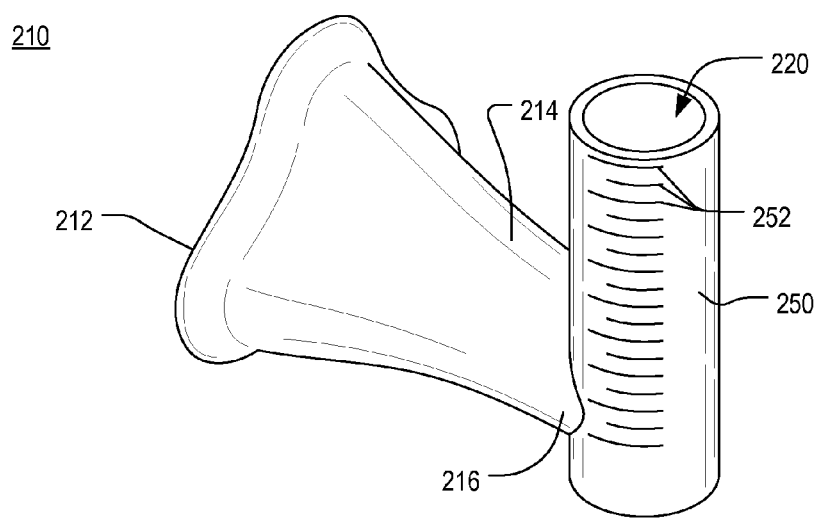
FIGS. 21 and 22 are front perspective views of a training apparatus in accordance with one or more embodiments of the present invention.
Figure 22:
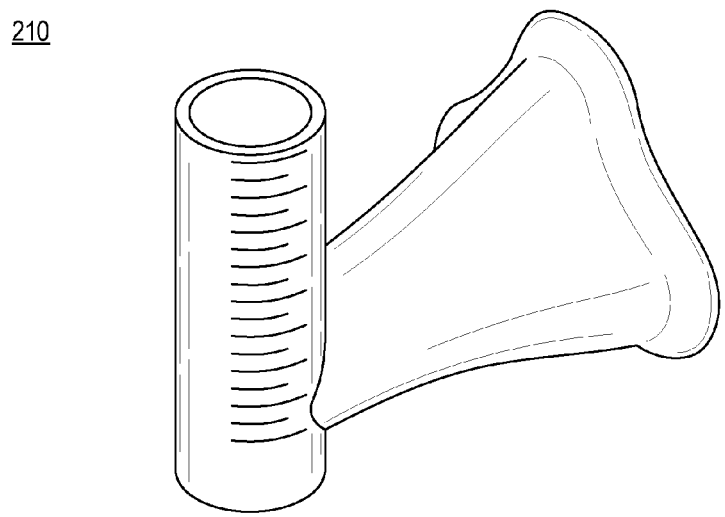
Figure 23:
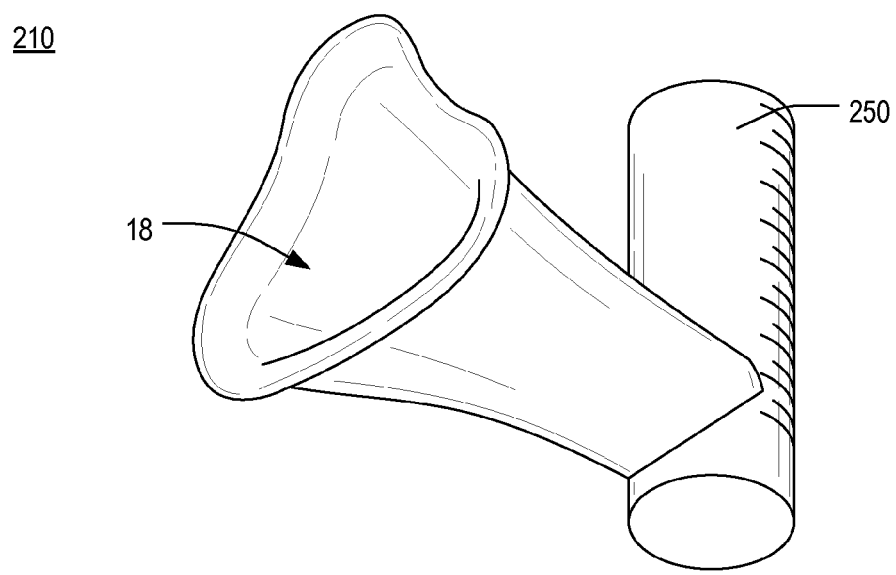
FIG. 23 is a rear perspective view of the training apparatus of FIG. 21.

FIGS. 21 and 22 are front perspective views of a training apparatus 210 in accordance with one or more embodiments of the present invention. FIG. 23 is a rear perspective view of the training apparatus 210 of FIG. 21. The training apparatus 210 of FIGS. 21-23 can have a uniform construction or can be made from a plurality of assembled components. It is contemplated that the training apparatus 210 and components used to assemble the training apparatus 210 can be made from a molded silicone or plastic material. In this regard, the molded silicone or plastic can impart flexibility and durability to the training apparatus 210.

Figure 24:
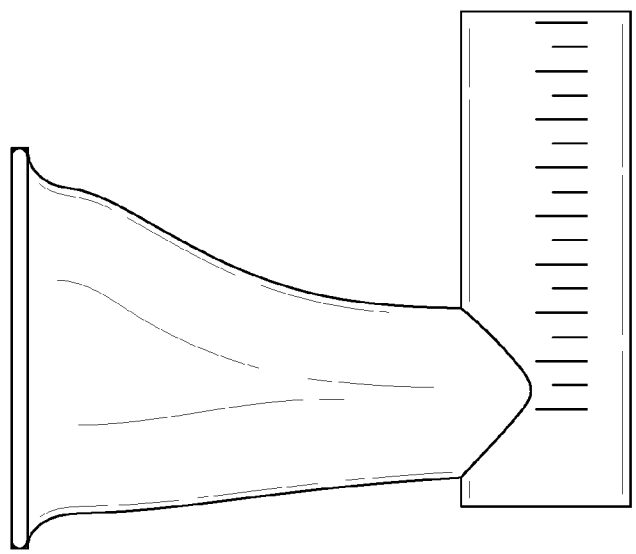
FIG. 24 is a side view of the training apparatus of FIG. 21.
Figure 25:
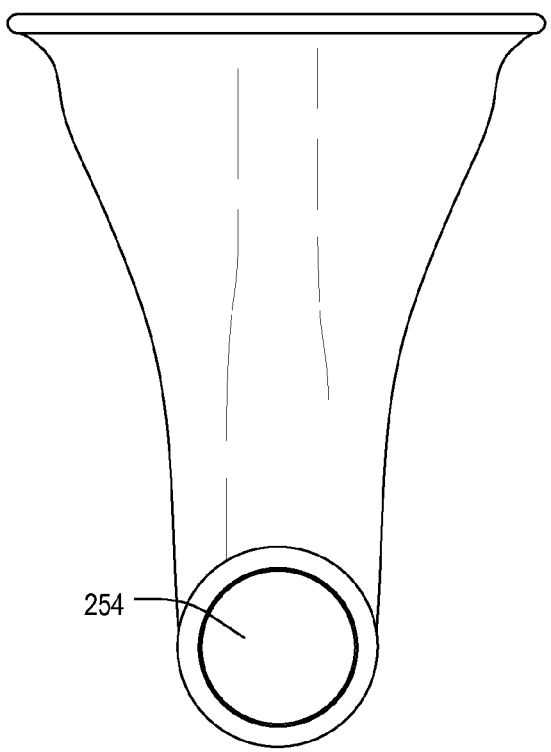
FIG. 25 is a top view of the training apparatus of FIG. 21.
Figure 26:
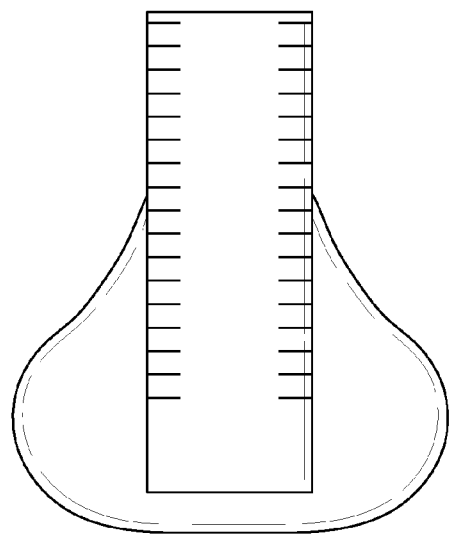
FIG. 26 is a front view of the training apparatus of FIG. 21.
Figure 27:
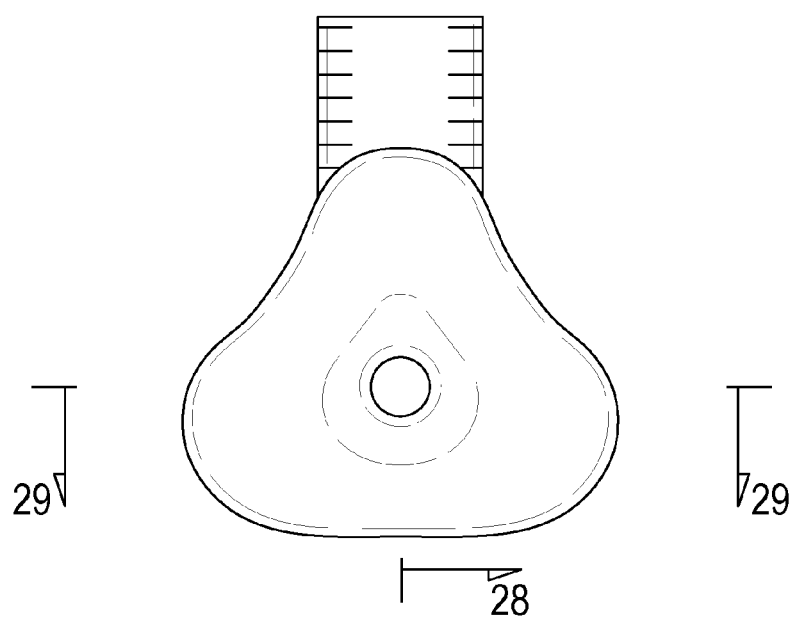
FIG. 27 is a rear view of the training apparatus of FIG. 21.

FIG. 24 is a side view of the training apparatus 210 of FIG. 21, and FIG. 25 is a top view of the training apparatus 210 of FIG. 21. FIG. 26 is a front view of the training apparatus 210 of FIG. 21, and FIG. 27 is a rear view of the training apparatus 210 of FIG. 21. As can be seen in FIGS. 21-27, the training apparatus 210 includes a proximal end 212 and a distal end 216 interconnected with a tapered chute 214. The proximal end 212 includes a proximal opening 218 sized to fit comfortably over the nose of a young child between the approximate ages of two and five. The distal end 216 includes a force measurement device 250 attached to the tapered chute 214. As perhaps best seen in FIG. 24, the force measurement device 250 includes a series of gradation lines 252 and a distal opening 220 at the top thereof. The tapered chute 214 and the force measurement device 250 each have a hollow interior such that an internal passageway 228 (perhaps best seen in FIGS. 28 and 29) exists between the proximal opening 218 and the distal opening 220.

Figure 28:
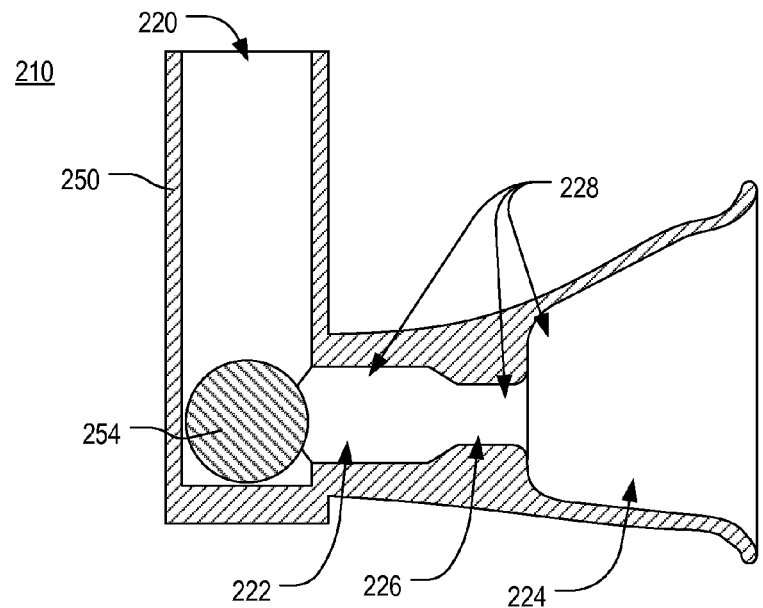
FIG. 28 is a side sectional view of the training apparatus of FIG. 21, taken along line 28-28 of FIG. 27.
Figure 29:
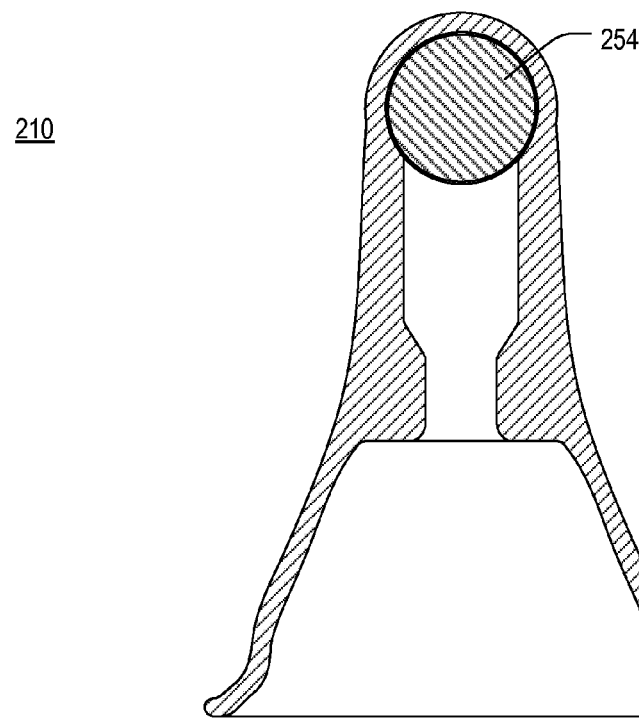
FIG. 29 is a top sectional view of the training apparatus of FIG. 21, taken along line 29-29 of FIG. 27.

FIG. 28 is a side sectional view of the training apparatus 210 of FIG. 21, taken along line 28-28 of FIG. 27, and FIG. 29 is a top sectional view of the training apparatus 210 of FIG. 21, taken along line 29-29 of FIG. 27. As shown in FIGS. 28 and 29, the internal passageway 228 connecting the proximal opening 218 and the distal opening 220 has a varying width. Toward the proximal opening 218, the internal passageway 228 has a relatively wide portion 224 that is generally bell-shaped, which provides an interior space wide enough to fit comfortably over the nose of a young child. Toward the force measurement device 250 at the distal end 216, the internal passageway 228 has a relatively narrow portion 222 that is generally tube-shaped. Connecting the wide portion 224 with the narrow portion 222 is a central portion 226, which has a width even more narrow than that of the narrow portion 222. The force measurement device 250 includes a generally cylindrical interior shape with the distal opening 220 at the top thereof.

The internal passageway 228 defines a path by which exhaled air can pass. In particular, air can be exhaled into the wide portion 224 via the proximal opening 218. Exhaled air is then forced into and through the central portion 226 and the narrow portion 222 before entering the force measurement device 250. Exhaled air is then forced upward through the force measurement device 250 and out of the distal opening 220, as will be explained in greater detail below.

As perhaps best seen in FIG. 28, the training apparatus 210 further includes a float object 254 housed within the force measurement device. Though the float object 254 can have any of a variety of different shapes and sizes, the float object 254 of the contemplated embodiment of FIGS. 21-29 is a sphere. The float object 254 is shaped so as to be capable of free movement within the generally cylindrical interior shape of the force measurement device 250. When at rest, the float object 254 is arranged at the lowermost end of the force measurement device 250, which is in general alignment with the distal end 216 of the tapered chute 214.

In a method of use, the training apparatus 210 is adapted to provide a young child with direct positive feedback as the child learns to exhale through his or her nose. In the contemplated embodiment of FIGS. 21-29, the positive feedback includes using exhaled air to push the float object 254 upward within the force measurement device 250, thereby providing an indication as to the amount of force exerted in exhaling. An adult or a medical professional can place the training apparatus 210 over the child's nose and can encourage the child to exhale air through his or her nose. When the child exhales through his or her nose, the exhaled air passes through the internal passageway 228 and builds pressure behind the float object 254. When the pressure is great enough, the float object 254 is pushed upward within the force measurement device 250. The adult or medical professional can assess the amount of force exerted by the exhaled air by the distance that the float object 254 travels upward within the force measurement device 250. It is contemplated that the amount of force can be quantified by comparing the distance that the float object 254 travels within the force measurement device 250 with the gradation lines 252 arranged along the height of the force measurement device 250. In this manner, the training apparatus 10 is adapted to help young children learn to blow their nose by increasing proprioception (self awareness) and helping them to learn to purposefully exhale through their nose. The method also provides entertainment for the child, potentially turning a chore or unpleasant experience into a game.

Additionally, it is contemplated that medical professionals can use the training apparatus 210 to help young children and their parents understand the amount of force that is appropriate for proper nose blowing. It is further contemplated that the training apparatus 210 has utility across a wide range of other breathing exercises and can be used across a wide patient base, including both children as well as adults.

According to a contemplated method of manufacturing, the training apparatus 210 can be manufactured using an injection molding process. In particular, a hard exterior mold for the training apparatus 210 can be developed to have a desired shape and size. The silicone or plastic material can be injected into the mold in a liquid form. Once the injected liquid has solidified, the resultant molded component can be removed from the mold. It is further contemplated that the force measurement device 250 can be molded into the training apparatus 210 as part of a unitary construction, or the force measurement device 250 can be molded as a separate structure that is then fitted with the training apparatus 210.

In order to ensure safety and health of a young child, the training apparatus 10,110,210 can be used under the supervision of an adult. Furthermore, safety can be encouraged by using the training apparatus 10,110,210 when a child is not otherwise sick or congested. In this regard, a child can learn proper exhaling under well conditions, and the child can then implement his or her training when congestion develops.

Based on the foregoing information, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements; the present invention being limited only by the claims appended hereto and the equivalents thereof.

What is provisionally claimed is:

1. A method for training a child how to blow his or her nose, the method comprising:
   (a) providing a training apparatus comprising:
      (i) a tapered chute having proximal and distal ends, the tapered chute defining an internal passageway connecting the proximal and distal ends,
      (ii) wherein the proximal end includes a proximal opening that is sufficiently wide to fit over the child's nose, the opening defined by a nosepiece having two lobes adapted to fit around nostrils of the child's nose and by a bridge lobe adapted to fit over a bridge of the child's nose,
      (iii) wherein the distal end includes a distal opening that is smaller than the proximal opening,
      (iv) wherein the internal passageway includes a narrow portion, adjoining the distal opening,
      (v) wherein the internal passageway includes a central portion, adjoining the narrow portion, which is narrower than the narrow portion;
   (b) inserting, by an adult, a projectile into the distal opening such that it is lodged within the narrow portion, the projectile being sized and dimensioned to correspond to the narrow portion;
   (c) placing, by the adult, the training apparatus over the child's nose such that the training apparatus fits around the nostrils of the child's nose and over the bridge of the child's nose;
   (d) inhaling, by the child through his or her nose, air and effecting a pulling force on the projectile, the projectile being prevented from being pulled inward into the child's nose by the central portion; and
   (e) exhaling, by the child through his or her nose, air and effecting a pushing force on the projectile that ejects the projectile from the training apparatus.

2. The method of claim 1, wherein the tapered chute is made from a silicone material.

3. The method of claim 1, wherein the tapered chute is made from a plastic material.

4. The method of claim 1, wherein the tapered chute is made using an injecting molding process.

5. A method for training a child how to blow his or her nose, the method comprising:
   (a) providing a training apparatus comprising;
      (i) a tapered chute having proximal and distal ends, the tapered chute defining an internal passageway connecting the proximal and distal ends,
      (ii) wherein the proximal end includes a proximal opening that is sufficiently wide to fit over the child's nose, the opening defined by a nosepiece having two lobes adapted to fit around nostrils of the child's nose and by a bridge lobe adapted to fit over a bridge of the child's nose,
      (iii) wherein the distal end includes a distal opening that is smaller than the proximal opening,
      (iv) wherein the internal passageway includes
         (A) a first portion extending from the proximal opening defined within the nosepiece, the first portion including generally vertical walls opposite the proximal opening, and a cross-sectional area of the first portion generally tapering downward from the proximal opening to the generally vertical walls,
         (B) a second portion extending from the distal opening, and
         (C) a third, central portion extending from the generally vertical walls, the central portion connecting the first portion to the second portion, and a cross-sectional area of the central portion being smaller than a cross-sectional area of the second portion, and the central portion being sized to snugly accommodate a projectile lodged therein;
   (b) inserting, by an adult, a projectile into the distal opening such that it is lodged within the second portion, the projectile being sized and dimensioned to correspond to the second portion;

(c) placing, by the adult, the training apparatus over the child's nose such that the training apparatus fits around the nostrils of the child's nose and over the bridge of the child's nose;
(d) inhaling, by the child through his or her nose, air and effecting a pulling force on the projectile, the projectile being prevented from being pulled inward into the child's nose by the central portion; and
(e) exhaling, by the child through his or her nose, air and effecting a pushing force on the projectile that ejects the projectile from the training apparatus.

6. The method of claim 5, wherein the tapered chute is made from a silicone material.

7. The method of claim 6, wherein the tapered chute is made from a plastic material.

8. The method of claim 7, wherein the tapered chute is made using an injecting molding process.

* * * * *